Nov. 27, 1934.  D. CANADY  1,982,133
INDICATING SIGNALING DEVICE
Filed Nov. 10, 1932

INVENTOR.
Don Canady
BY
Lawler + Lawler.
ATTORNEYS.

Patented Nov. 27, 1934

1,982,133

UNITED STATES PATENT OFFICE 1,982,133

INDICATING SIGNALING DEVICE

Don Canady, Cleveland, Ohio

Application November 10, 1932, Serial No. 642,036

4 Claims. (Cl. 177—311)

This improvement relates to improvements in a signaling means used to determine the amount of film left on a supply reel in a supply magazine of a motion picture projecting machine or the like. More particularly it has reference to optico-electrical instrumentalities used for the purpose of actuating an alarm of a visible or audible nature or both, thus dispensing with the time-consuming method of having to continually watch the moving member whilst in operation.

One of the most important objects of the present invention is to provide means of the character described for conveniently and efficiently determining an exact amount of film to be left unwound on a supply reel by means of light rays which impinge upon a light-sensitive cell. The light rays pass at a tangency to the film or thereacross. When the point of tangency has been reached, the film that previously obstructed the light ray, allows the light ray to reach the light sensitive cell, the effect being the light-responsive cell, or light-sensitive element actuates the signaling instrumentalities.

Other objects and advantages reside in certain novel features of construction, arrangement and combination of parts which will be hereinafter and more fully described and pointed out in the appended claims.

Like numerals refer to similar parts in the several figures.

Figure 1 is a side fragmentary view of a motion picture projector with its film magazine, with a film partly unwound therein, and showing a light source, and the rays from the same being obstructed by the film. When the film allows the light rays to pass tangentially to the light-sensitive element or cell, the same is energized, and the alarming instrumentality is set into operation.

The sensitive cell has electrically associated therewith a conventional wiring system having incorporated therein, a relay A, a battery B, and an electric bell C, or signaling means.

Figure 1:
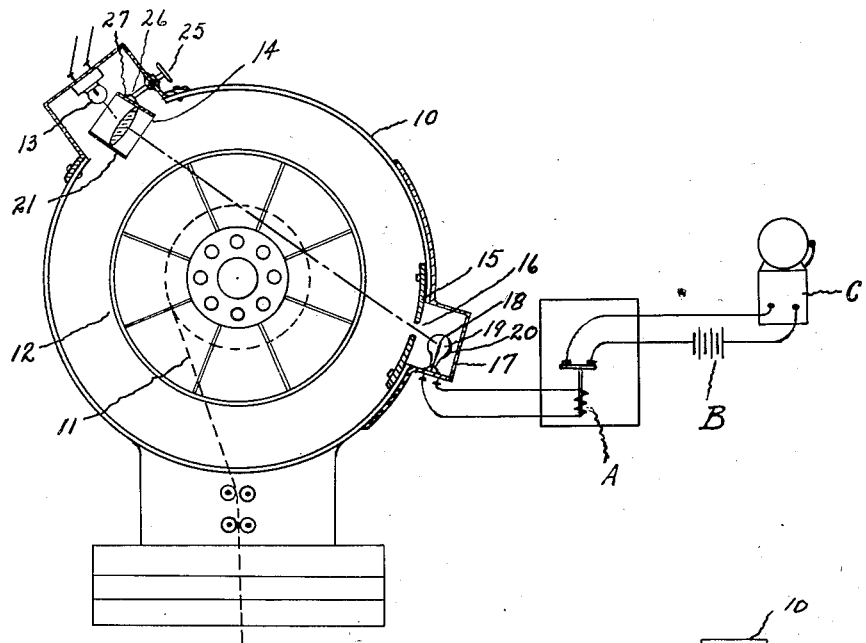
Figure 2:
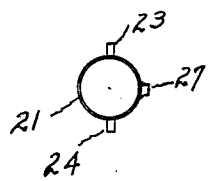
Figure 2 is a plan view of the tubular member that carries the condensing lens system, showing the trunnions on the member and also a socket for the reception of the end of the adjusting screw that may be used to control the tubular member.

An embodiment of my invention is illustrated in the drawing, wherein 10 indicates a film magazine having a film 11 therein wound on a reel 12 in the usual manner, and ready for use.

Mounted adjustably on the magazine there is provided a light source 13 which may have an adjustable electric resistance in the circuit for the lamp bulb for variable illuminating purposes, having adjustably associated therewith a condensing lens 14 serving to focus the light rays from the lamp bulb filament onto the light sensitive cell. It is absolutely necessary that the light rays be imaged on the sensitive cell. The lens in the tubular member may be focussable to arrange the pencil of light to suit the requirements of the different adjustable positions. The light source may be a Mazda lamp provided with a solid strip of tungsten, thereby representing a homogeneous and constant light or any other suitable lamp may be used.

The film magazine may be provided with an adjustable element 15 having an aperture 16 therein, adapted to concentrate the light rays upon the sensitive light cell.

The housing 17 mounted on the film magazine and carrying the sensitive cell 18 may be adjustably mounted on the film magazine.

The sensitive cell is provided with a cathode 19, and an anode 20. The adjustability of the light source and the sensitive cell provides a means whereby the tangency of the light rays passing over the film may be adjusted accurately, to and for the amount of film to be left unwound in the film magazine. The features of adjustability of the light source, the lens or optical system, and the sensitive cell provides a simple method of aligning the light rays upon the sensitive cell.

The tubular member 21 carrying the condensing lens 22 is provided with trunnions 23 and 24. The adjusting screw 25 is operatively associated with the lens carrying structure in the lamp housing, and the end of the screw 26 is of spherical configuration and is mounted in the socket 27 adapted to receive the same. When the screw is manipulated backward or forward, the tube containing the condensing lens can be at will oscillated to align with the oppositely positioned sensitive light cell.

Figure 3:
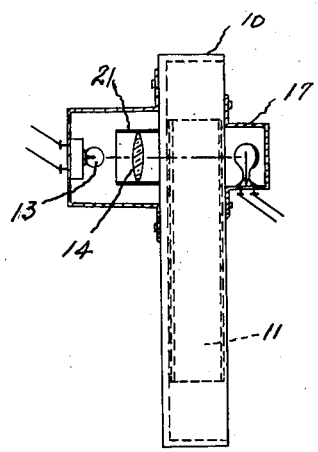
Figure 3 is an edge view of a film magazine, showing the light source and the sensitive cell directly opposite to each other and the light rays passing over and across the film member and not tangentially thereto as shown in Figure 1.

In the view shown in Figure 3 the housing carrying the light source with its lens system, and the housing carrying the light sensitive cell are adjustable up or down vertically, otherwise the construction is similar to that already described in connection with Figure 1.

It is evident from the disclosure that the signal is designed expressly to provide positive protection against accidental unwinding of the film, and that so long as the diameter of the film does not get below the tangency of the light rays to the moving film, the signal will not operate, but just as soon as the focused light rays can pass at a tangency to the film to the sensitive light cell, the signal is instantaneously cut into operation, and the operator thereby notified that the stopping point has been reached.

This simple and utterly reliable means assures a maximum operating efficiency with a minimum of operating and maintenance expense. It also eliminates the dependency placed on the human element, where there is a possibility of carelessness and lack of systematic operating attention, and it assures efficient operation.

While I have herein shown and described an operative arrangement of the device, it will be readily understood that changes and modifications therein may be found desirable or essential in meeting the various exigencies of use, and I desire to be understood as reserving the right to make any and all such changes or modifications as might be found desirable or essential, in so far as the same may fall within the spirit and scope of the invention as expressed in the accompanying claims when broadly construed.

Having thus fully described my invention, what I do claim and desire to obtain by Letters Patent of the United States of America, is:—

1. In an apparatus of the character described for motion picture projector reels including means on one side of the reel for passing a beam of radiant energy tangentially across the reel in the space normally occupied by a film when wound thereon, radiant energy responsive means in the path of said beam on the other side of said reel, and control means operated on response of the radiant energy responsive device to the beam from the radiant energy source when said space is unoccupied.

2. In an apparatus of the character described for motion picture projector reels including means on one side of the reel for giving a beam of radiant energy, means on the same side of the reel operatively associated with the said means for passing the beam of radiant energy tangentially across the reel in the space normally occupied by a film when wound thereon, radiant energy responsive means in the path of said beam on the other side of said reel and control means operated on response of the radiant energy responsive device to the beam from the radiant energy source when said space is unoccupied.

3. In an apparatus of the character described for motion picture projector reels including means on one side of the reel for giving a beam of radiant energy, means on the same side of the reel operatively associated with the said means for focusing the beam of radiant energy tangentially across the reel in the space normally occupied by a film when wound thereon, radiant energy responsive means in the path of said beam on the other side of said reel, and control means operated on response of the radiant energy responsive device to the beam from the radiant energy source when said space is unoccupied.

4. In an apparatus of the character described for motion picture projector reels including means on one side of the reel for passing a beam of radiant energy tangentially across the reel in the space normally occupied by a film when wound thereon, radiant energy responsive means in the path of said beam on the other side of the reel and electrical means operatively associated with a signaling means operated on response of the radiant energy responsive device to the beam from the radiant energy source when said space is unoccupied.

DON CANADY.